United States Patent [19] [11] 4,032,700
Song et al. [45] June 28, 1977

[54] PROCESS FOR THE PREPARATION OF AMINATED POLYMERS USEFUL AS ADDITIVES FOR FUELS AND LUBRICANTS

[75] Inventors: Won R. Song, Maplewood; John Brooke Gardiner, Mountainside; Lawrence James Engel, Green Brook Township, all of N.J.

[73] Assignee: Exxon Research and Engineering Company, Linden, N.J.

[22] Filed: Sept. 15, 1975

[21] Appl. No.: 613,052

Related U.S. Application Data

[63] Continuation-in-part of Ser. No. 373,511, June 25, 1973.

[52] U.S. Cl. .............................. 526/43; 260/585 A; 526/49
[51] Int. Cl.$^2$ ....................... C08F 8/26; C08G 8/32
[58] Field of Search ...... 260/80.78, 94.7 N, 585 A; 450/619.5; 526/49, 43

[56] References Cited

UNITED STATES PATENTS

| | | | |
|---|---|---|---|
| 3,445,387 | 5/1969 | Liston | 260/80.78 X |
| 3,524,826 | 8/1970 | Kresge et al. | 260/80.78 X |

*Primary Examiner*—William F. Hamrock
*Attorney, Agent, or Firm*—Frank T. Johmann; Roland A. Dexter

[57] ABSTRACT

Preparation of aminated polymeric additives useful as oil additives, for example as dispersants for hydrocarbon fuels and lubricants, and as multifunctional dispersant-viscosity index improvers for lubricants, by the reaction of amine with a halogen containing copolymer of ethylene, a $C_3$ to $C_{18}$ straight or branched chain α-olefin and a $C_5$ to $C_{14}$ acyclic or alicyclic nonconjugated diolefin, said halogen containing copolymer being prepared by the halogenation of said copolymer.

9 Claims, No Drawings

PROCESS FOR THE PREPARATION OF AMINATED POLYMERS USEFUL AS ADDITIVES FOR FUELS AND LUBRICANTS

RELATED CASES

This application is a continuation-in-part of U.S. pat. application Ser. No. 373,511 filed June 25, 1974.

BACKGROUND OF THE INVENTION

Field of the Invention

This invention relates to a process for the preparation of the reaction products of copolymers first halogenated and thereafter aminated with amines, and to compositions comprising a major proportion of a fuel or lubricant and a minor proportion of said halogenated then aminated polymer as a sludge dispersant and/or V.I. improver. More particularly, this invention relates to copolymers comprising ethylene, a higher α-olefin and an acyclic or alicyclic nonconjugated diolefin, which are first halogenated and thereafter aminated by reaction with an amine.

Somewhat similar compositions comprising polymeric or high molecular weight materials which incorporate nitrogen have been described both in structure and the related method of preparation in U.S. and foreign patents as dispersants and/or viscosity index improvers for fuels and/or lubricants. For example:

U.S. Pat. No. 3,272,746 discloses lubricant compositions containing acylated nitrogen compounds having at least 50 aliphatic carbon atoms in the hydrocarbon substituent such as polyisobutylene succinimides of polyalkylene polyamines as sludge dispersants for lubricants.

U.S. Pat. Nos. 3,316,177; 3,687,849 and 3,687,905 disclose polyamines reacted with the reaction product of maleic anhydride with an oxidized degraded interpolymer containing ethylene and propylene as a sludge dispersant in lubricant compositions.

U.S. Pat. No. 3,378,492 discloses polymers of conjugated dienes having backbone chain unsaturation which is predominantly cis in configuration, onto which is grafted acrylonitrile.

U.S. Pat. No. 3,438,757 describes the preparation of fuel detergents by the reaction of backbone chain chlorinated branched chain polymers, such as polyisobutylene or polypropylene with polyamines.

U.S. Pat. No. 3,462,249 teaches of terpolymer of ethylene, propylene and a diene which is reacted first with maleic anhydride and then reacted with a polyamine.

U.S. Pat. No. 3,445,387 teaches a terpolymer of ethylene, propylene and an unsaturated olefin having nitrogen as a dispersant-detergent-viscosity index improving polymer for lubricating oil and its alternative preparation by displacement of the halogen of a primary halo-substituted olefin with a basic nitrogen compound.

U.S. Pat. No. 3,652,239 teaches that an ethylene, $C_3$–$C_4$ olefin-diene terpolymer reacted with maleic anhydride and then reacted with an alkyl amine is an additive useful for a light fuel.

British Patent 1,005,638 describes the preparation of ashless dispersants for lubricants by the reaction of a backbone chlorinated ethylene-propylene copolymer with a polyalkylene polyamine.

SUMMARY OF THE INVENTION

It has now been found that highly effective dispersants and multifunctional dispersant-viscosity index improvers for fuels and lubricants are readily prepared by first halogenating a copolymer of ethylene, a $C_3$ to $C_{18}$ straight or branched chain α-chain olefin and a $C_5$ to $C_{14}$ acyclic or alicyclic nonconjugated diolefin and thereafter reacting said copolymer with an amine.

The haolgen in the halogenated copolymer is external to the backbone chain of carbon atoms and can be incorporated in the copolymer prior to amination according to the process of the invention by addition of halogen to an olefinic double bond in a hydrocarbon moeity which is pendant to the backbone chain of carbon atoms, or allylic halogenation of a similarly located olefinic double bond. This contrasts with the less efficient pirorart process of U.S. Pat. No. 3,445,387 wherein the halogen can be incorporated directly in a ethylene-propylene copolymer by using a $C_3$ to $C_{12}$ primary halogen-substituted olefin in place of the above-noted diolefin.

DESCRIPTION OF THE PREFERRED EMBODIMENTS

The Copolymer

Ethylene-$C_3$ to $C_{18}$ α-olefin-$C_5$ to $C_{14}$ nonconjugated diolefin copolymers which are to be halogenated comprise about 30 to 84.5 mole % ethylene; about 15 to 69.5 mole % of the higher, i.e. $C_3$ to $C_{18}$, preferably $C_3$ to $C_8$ olefin, and most preferably propylene; and about 0.5 to 20 mole % of the diolefin. Preferred are polymers of 40 to 70 mole % ethylene, 20 to 58 mole % of the higher olefin and 2 and 10 mole % of diolefins. On a weight basis usually at least 2 or 3 wt. % of the polymer will be the diolefin. Mixtures of monoolefins and/or mixtures of diolefins can be used.

Examples of the above-noted alpha monoolefins include propylene, 1-butene, 1-pentene, 1-hexene, 1-heptene, 1-decene, 1-dodecene, etc.

Representative non-limiting examples of nonconjugated diolefins include:

A. Straight chain acyclic dienes such as: 1,4-hexadiene; 1,5-heptadiene, 1,6-octadiene.

B. Branched chain acyclic dienes such as: 5-methyl-1, 4-hexadiene; 3,7-dimethyl 1,6-octadiene; 3,7-dimethyl 1,7-octadiene; and the mixed isomers of dihydromyrcene and dihydroocimene.

C. Single ring alicyclic dienes such as: 1,4-cyclohexadiene; 1,5-cyclo-octadiene; 1,5-cyclododecadiene; 4-vinylcyclohexene; 1-allyl 4-isopropylidene cyclohexane; 3-allylcyclopentene; 4-allyl-cyclohexene and 1-isopropenyl 4(4-butenyl) cyclohexane.

D. Multi-single ring alicyclic dienes such as: 4,4'-dicyclopentenyl and 4,4'-dicyclohexenyl dienes.

E. Multi-ring alicyclic fused and bridged ring dienes such as: tetrahydroindene; methyl tetrahydroindene; dicyclopentadiene; bicyclo(2,2,1) hepta 2,5-diene; alkenyl, alkylidene, cycloalkenyl and cycloalkylidene norbornenes such as: 5-methylene-2-norbornene; 5-ethylidene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene and 5-cyclohexylidene-2-norbornene.

In general the preparation of copolymers suitable for the practice of this invention by means of Ziegler-Natta catalysts is known in the prior art, for example see U.S.

Pat. Nos. 2,933,480; 3,000,866; and 3,093,621. The copolymers, which are primarily produced for use in elastomeric compositions, are characterized by the absence of chain of backbone unsaturation, and when made from non-conjugated dienes contain sites of unsaturation in groups which are pendant to or are in cyclic structures outside the main polymer chain. These unsaturated structures render the polymers particularly resistant to breakdown by atmospheric oxidation or ozone. Ethylene-propylene-nonconjugated diolefin copolymers are known articles of commerce. In fact, various examples of such commercially available copolymers are VISTALON, an elastomeric copolymer of ethylene, propylene and 5-ethylidene, 2-norbornene, marketed by Exxon Chemical Co., New York, N.Y., and Nordel, a copolymer of ethylene, propylene and 1,4-hexadiene, marketed by E.I. duPont de Nemours & Co., Wilmington, Delaware.

In general, the catalyst compositions used to prepare these copolymers comprise a principal catalyst consisting of a transition metal compound from Groups IV$b$, V$b$ and VI$b$ of the Periodic Table of the Elements, particularly compounds of titanium and vanadium, and organometallic reducing compounds from Groups II$a$, II$b$ and III$a$, particularly organoaluminum compounds which are designated as co-catalysts. Preferred principal catalysts of vanadium have the general formula $VO_zX_t$ wherein $z$ has a value of 0 or 1 and $t$ has a value of 2 to 4. X is independently selected from the group consisting of halogens having an atomic number equal to or greater than 17, acetylacetonates, haloacetylacetonates, alkoxides and haloalkoxides. Non-limiting examples are: $VOCl_3$; $VO(AcAc)_2$; $VOCl(OBu)$; $V(AcAc)_3$; and $VOCl_2(AcAc)$ where Bu is n-butyl or isobutyl and (AcAc) is an acetylacetonate.

Preferred cocatalysts have the general formula $ALR'_mX'_n$ wherein R' is a monovalent hydrocarbon radical selected from the group consisting of $C_1$ to $C_{12}$ alkyl, alkylaryl, arylalkyl and cycloalkyl radicals, X' is a halogen having an atomic number equal to or greater than 17, $m$ is a number from 1 to 3 and the sum of $m$ and $n$ is equal to 3. Non-limiting examples of useful cocatalysts are: $Al(Et)_3$; $Al(IsoBu)_3$; $Et_2AlCl$; $EtAlCl_2$ and $Et_3Al_2Cl_3$. Syntheses of the copolymers, which may be conducted in batch, staged or continuous reactors, are preferably run in the presence of a purified solvent such as hexane which has been percolated through LINDE 3A catalyst and in the absence of moisture, air or oxygen and catalyst poisons. An atmosphere of oxygen-free nitrogen is preferably maintained above the reactants. Monomers, principal catalyst and cocatalyst are fed to the reactor supplied with means for withdrawing the heat of reaction and maintained under controlled agitation for a time, temperature and pressure sufficient to complete the reaction.

Suitable times of reaction will generally be in the range from 1 to 300 minutes, temperatures will usually be in the range of 0° C. to 100° C. and pressures from atmospheric to 160 psig are generally used. Monomer feed to the reactor per 100 parts by weight of solvent may be in the range of: ethylene, 2 to 20 parts by weight, $C_3$ to $C_{18}$ α-olefin, 4 to 20 parts by weight and nonconjugated diene 0.1 to 10 parts by weight.

Principal catalyst, $VOCl_3$ for example, prediluted with solvents is fed to the reactor so as to provide a concentration in the range of 0.1 to 5.0 millimoles per liter. Cocatalyst, for example $Et_3Al_2Cl_3$ is at the same time fed to the reactor in an amount equal to from 2.0 to 20.0 moles of cocatalyst per mole of principal catalyst.

The copolymers may have molecular weights $\overline{M}_n$ of about 1000 to 500,000; preferably 10,000 to 200,000; and usually about 20,000 to 100,000. In general, polymers having a narrow range of molecular weight, as determined by the ratio of weight average molecular weight ($\overline{M}_w$) to number average molcular weight ($\overline{M}_n$) are preferred. Polymers having a $\overline{M}_w/\overline{M}_n$ of less than 10, preferably less than 7, and most preferably 4 or less are most desirable. Polymers in this range may be obtained by a choice of synthesis conditions such as choice of principal catalyst and co-catalyst combination and addition of hydrogen during the synthesis. Post synthesis treatment such as extrusion at elevated temperature and under high shear through small orifices, and fractional precipitation from solution may also be used to obtain narrow ranges of desired molecular weights. For a comprehensive review of the art see: "Polymer Chemistry of Synthetic Elastomers," edited by Kennedy and Tornqvist, Interscience, N.Y 1969.

While these copolymers are essentially amorphous in character by superficial inspection, they may contain up to 25 percent by weight of crystalline segments as determined by X-ray or differential scanning calorimetry. Details of these methods for measurement of crystallinity are found in J. Polymer Sci. A-2, 9, 127 (1971) by G. VerStrate and Z.W. Wilchinsky.

Structurally, the copolymers suitable for conversion to dihalides or allylic halides for the practice of this invention may be illustrated for a number of nonconjugated diolefins as randomly distributed copolymers in which the following monomer moieties are linked in the polymer chain in random sequence and in a varying number.

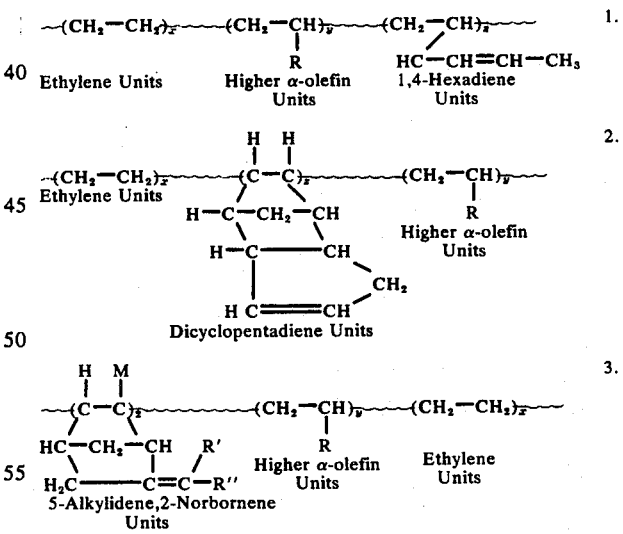

Wherein R is a $C_1$ $C_{16}$ straight or branched chain alkyl radical, R' and R" are independently selected from the group consisting of hydrogen and $C_1$ to $C_6$ alkyl radicals, and $x$, $y$ and $z$ are cardinal numbers, typically in the range of 1 to 100. It will be understood that the numerical values assigned to $x$, $y$ and $z$ are not necessarily totals for any monomer in the copolymer but that these numerical values express the number of times a given monomer may be repeated in the polymer chain before another monomer is interposed in the chain.

Halogenation of Diolefin Copolymers

The halogenation of the diolefin copolmyer can be carried out by simply dissolving the polymer in a solvent, preferably a solvent substantially inert to the halogen material, and adding halogen, e.g., gaseous chloride, liquid bromine, into the solution, preferably at rather low temperatures, e.g., 0° to 100° C. Primarily depending on the amount of halogen added and the number of double bonds available, 0.1 to 10.0, e.g., 0.2 to 8.0 wt. % halogen, e.g. Cl or Br, based on the weight of halogen containing copolymer, can be added to the polymer. In halogenation, the chlorine tends to react allylically, while the bromine tends to be incorporated by addition. If the reaction is carried out in an inert volatile solvent, then a non-volatile oil can be later added to the reaction product solution and the volatile solvent evaporated to thereby form an oil concentrate of the halogen containing diolefin copolymer for further handling. Alternatively, isolation of the halogenated polymer may be readily carried out, e.g., by precipitation in media such as acetone or isopropanol or by stripping with steam, etc.

In general, these techniques are known in the art; for example bromination of copolymers of ethylene, a $C_3$ to $C_8$ α-olefin and a $C_5$ to $C_{14}$ non-conjugated diolefin is illustrated in U.S. Pat. No. 3,524,826.

Non-limiting examples of viscinal brominated and allylically chlorinated copolymers of the invention may be illustrated structurally as:

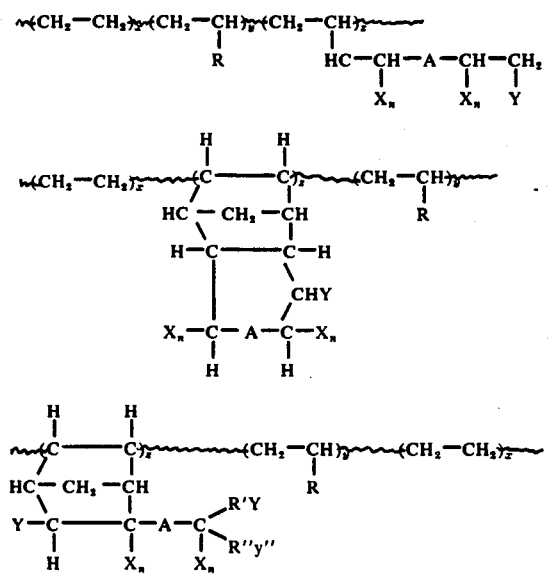

wherein R is a $C_1$ to $C_{16}$ straight or branched chain alkyl radical; R' and R" are independently selected from the group consisting of hydrogen and $C_1$ to $C_6$ aliphatic hydrocarbon radicals; x, y and z are cardinal numbers in the range of 1 to about 100; X, Y and Y' are independently selected from the group consisting of hydrogen, chlorine and bromine; A is a carbon to carbon single bond when Y and Y' are hydrogen and n is equal to 1. When A is a carbon to carbon double bond and n is 0, then Y can be chlorine or bromine and Y' can be hydrogen or Y' can be chlorine or bromine and Y can be hydrogen.

Halogen Containing Copolymer — Amine Reaction Products

In general, useful amines include amines of about 1 to 60, e.g. 4 to 20, total carbon atoms and about 1 to 12, e.g. 1 to 6 nitrogens, which amines may be hydrocarbyl amines or may include other groups, e.g. hydroxy groups, amide groups, imidazoline groups, etc. Preferred amines are aliphatic, saturated amines, including those of the general formulae:

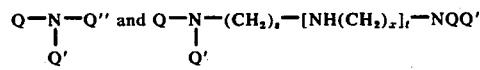

wherein Q, and Q' and Q" are independently selected from the group consisting of hydrogen, $C_1$ to $C_{12}$ straight or branched chain alkyl radicals or hydroxy alkyl radicals, and Ω -amino $C_2$ to $C_{12}$ alkylene radicals, s is a cardinal number of from 2 to 6, preferably 2 to 4, and t is a cardinal number of from 0 to 10, preferably 2 to 6.

Non-limiting examples include: ammonia; dodecylamine, di-(2-ethylhexyl)amine; di(trimethylene) triamine; 1,2-ethylene diamine, 1,2-propylene diamine; 1,3-propylene diamine; diethylene triamine; triethylene tetra-amine; tetraethylene penta-amine; di-(1,3-propylene) triamine; di-(1,4-butylene) triamine; xylylene diamine; N,N-dimethyl 1,3-diaminopropane and N,N-di-(2-aminoethyl) ethylene diamine, 4-methyl imidazoline; . 1,3-bis(2-aminoethyl) imidazoline; pyrimidine; diethanolamine; etc.

Other useful compounds include alicyclic diamines such as 1,2-di(aminomethyl) cyclohexane and heterocyclic nitrogen compounds such as the N-aminoalkyl piperazine of the general formula:

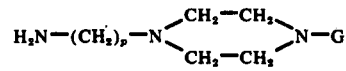

wherein G is independently selected from the group consisting of hydrogen and Ω aminoalkyl radicals of from 1 to 3 carbon atoms; and p is an integer of from 1 to 4. Non-limiting examples include: N-(2-aminoethyl piperazine; N-(2-aminopropyl) piperazine; and N,N'-di-(2-aminoethyl) piperazine.

Commercial mixtures of amines may be used in the practice of this invention. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, usually of 2 to 4 carbons including polyalkyleneamines such as tetraethylene pentamine and its homologs including piperazines. Low cost polyethyleneamine commercial mixtures which have a composition roughly corresponding to tetraethylene pentamine and its higher analogs, are available under the trade names "Polyamine H" and "Polyamine 400" (PA-400). Another similar mixture sold as "Polyamine 500" (PA-500) is produced by Jefferson Chemical Co., New York, N.Y. Similar materials are made by the polymerization of aziridine, 2-methyl aziridine and azetidine.

Reaction of the halo-copolymer, usually dissolved in a solvent or diluent oil, with the amine component will usually be carried out at a temperature in the range of 20° C. to 200° C., for about 0.1 to 100 hours, at atmospheric pressure in the case of high boiling amines or under superatmospheric pressure in the case of low boiling amines such as ethylene diamine. In either case it is desirable to maintain an inert atmosphere such as nitrogen in the reaction mixture. The reaction can be carried out in the presence of a base, such as a metal oxide, hydroxide, etc., preferably an alkaline earth metal oxide, e.g., CaO or BaO to absorb HCl that may evolve, although good results have been obtained without the presence of the base. If the metal base is used, then, of course, it can be later removed by centrifuging or filtration at the end of the reaction.

The reaction of a bromo copolymer prepared according to the method of this invention with an amine component, e.g. triethylene tetramine, has viscinal dibromo substituents which are readily replaced in the amine reaction, e.g. at temperatures ranging from 20° C. to 60° C. Further, the allylic chloride of the chlorocopolymer prepared according to this invention is replaced at moderate conditions, e.g. about 6 hours at 180° C., relative to those required for reaction at the primary chloride site as will be seen from the data of this specification.

By carrying out the reaction in the presence of oil, a concentrate of the aminated product will be formed which can then be used directly as an additive. Of course, if desired, the aminated product per se can be recovered by carrying the reaction out in a volatile solvent, which is later evaporated. About 10 to 100%, e.g., 30 to 90 mole % of the halogens available may be replaced by amination groups to give a final product with 0.02 to 2.0 wt.%, preferably 0.05 to 1.0 wt. % nitrogen based on the aminated polymer per se. Frequently the aminated polymer may also contain 0 to 3 wt. % of halogen remaining after amination. Any remaining halogen would contribute mild e.p. properties.

The oil soluble reaction products of this invention can be incorporated in lubricating oil compositions, e.g. automotive crankcase lubricating oils, in concentrations within the range of about 0.01 to 20 weight percent, e.g. 0.1 to 10 weight percent, preferably 0.3 to 3.0 weight percent, of the total composition. The lubricants to which the aminated products of this invention can be added include not only hydrocarbon oils derived from petroleum but also include synthetic oils such as alkyl esters of dibasic acids, complex esters comprising dibasic acids, polyglycols and alcohols, esters of carbonic and phosphoric acids, polyglycols and carboxylic acid esters of polyglycols, etc.

When the products of this invention are used as dispersants in fuels such as the normally liquid fuels as gasoline, kerosene, diesel fuels, No. 2 fuel oil and middle distillates, a concentration of the additive in the fuel in the range of 0.001 to 0.5 weight percent based on the weight of the total composition will usually be employed.

The additive may be conveniently dispensed as a concentrate comprising a minor proportion of the additive, e.g., 2 to 45 parts by weight, dissolved in a major proportion of a mineral lubricating oil, e.g. 98 to 45 parts by weight, with or without other additives being present.

In the above compositions or concentrates, other conventional additives may also be present, including dyes, pour point depressants, antiwear agents such as tricresyl phosphate or zinc dialkyl dithiophosphates of 3 to 8 carbon atoms, antioxidants such as N-phenyl α-naphthylamine, tert-octyl phenol sulfide, 4,4'-methylene bis(2,6-di tert-butyl phenol), viscosity index improvers such as ethylenepropylene copolymers, polymethacrylates, polyisobutylene, alkyl fumarate-vinyl acetate copolymers and the like as well as other ashless dispersants, detergents and viscosity index improvers.

This invention will be further understood by reference to the following examples, which include preferred embodiments of the invention.

Halogenation of Copolymers

The following oil soluble random copolymers, all of which were substantially amorphous, were halogenated.

Polymer A was a terpolymer of about 49 wt. % ethylene, 9.7 wt. % 5-ethylidene norbornene-2 and the remainder propylene. It has a $\overline{M}_n$ (number average molecular weight) of about 65,000 and a $\overline{M}_w/\overline{M}_n$ ratio of about 3 to 3.5

Polymer B comprised about 50 wt. % of ethylene, 3.8 wt. % of 5-ethylidene norbornene-2 and the remainder propylene. It had a $\overline{M}_n$ of about 50,000 and a $\overline{M}_w/\overline{M}_n$ ratio less than 4.

Polymer C (Nordel 1320) comprised about 53 wt. % of ethylene, 3.5 wt. % of 1,4-hexadiene and the remainder propylene. It had an estimated $\overline{M}_n$ molecular weight of approximately 50,000.

Polymer D comprised 53 wt. % of ethylene, 7.5 wt. % of 5-ethylidene norbornene-2 and the remainder propylene. This terpolymer had a number average molecular weight of about 7500.

EXAMPLE 1

In a flask, 560 gms. of Polymer A was dissolved in 7440 gms. of heptane by stirring at room temperature to make a 7 wt. % solution of Polymer A in heptane.

A reaction flask was then charged with 2680 gms. of said 7 wt. % solution and heated to 60° C. with stirring. Ten gms. of chlorine (as determined by noting the change in weight of the chlorine cylinder used to supply the chlorine) was bubbled into the solution over a period of an hour while stirring. Nitrogen was then bubbled through the flask overnight to evaporate the heptane. 2680 gms. of Solvent 150 Neutral was added and heated at 100° C. for 48 hours to give an oil solution. A sample was freed from the oil by dialysis through a rubber membrane and contained 2.27 wt. % allylic chlorine.

EXAMPLE 2

560 gms. of Polymer B was dissolved in 7440 gms. of heptane in a 12 liter flask equipped with a heating mantle, mechanical stirrer, inlet for chlorine, a sodium hydroxide scrubber consisting of 20 gms. of a 50 wt. % solution of sodium hydroxide dissolved in water, and a thermometer. The composition was stirred at room temperature, e.g. about 77° F. and allowed to mix over a two-day weekend. The heat was turned on and the temperature rose to about 80° C. About 1750 ml. of material was removed from the flask as the flask was too full. The heat was then maintained in the range of about 75° to 85° C. and chlorine addition was begun. A total of 12.2 gms. of chlorine was added over a period of time of about 40 minutes. Following this, a slow nitrogen sparge was carried out overnight at about 90° C. The following day, the dissolved chlorinated composition was removed from the reaction flask. A portion of the composition was then stripped from heptane by blowing with nitrogen on a steam bath. Analysis of the allylically chlorinated polymer residue indicated 1.35 wt. % chlorine content.

EXAMPLE 3

780 gms. of Polymer C was dissolved in a mixture of 5000 gms. of heptane and 5360 gms. of hexane by stirring at room temperature for 48 hours. 3316 gms. of the resulting polymer cement was placed in a 5.1 flask equipped with a thermometer, condenser, nitrogen sparge, chlorine inlet and a stirrer. The flask was then heated to a temperature in the range of about 50° to 55° C. and 14.5 gms. of chlorine was added over a 30 minute period. The resulting solution was a bright yellow. Following this, the solution was sparged with nitrogen for about 12 hours while maintaining the temperature of 40° C. Heat was applied and the solvent was evaporated from the mixture at a temperature ranging from 60° C. to 120° C. As the solvent was coming off during evaporation, 3060 gms. of a low pour point Solvent 150 Neutral mineral oil of about 150 SUS viscosity at 100° F. were added. The evaporation and the periodic addition of the Solvent 150 Neutral was carried out over a total of about 16 hours during which time the temperature climbed to a final point of 150° C. Some darkening occurred during the last 3 or 4 hours while the temperature was in the general range of about 120° to about 150° C. Analysis indicated that the allylically chlorinated polymer contained about 2.44 wt. % chlorine.

EXAMPLE 4

To a 10 gal. reactor there was added 1283 gms. of Polymer B along with 17,050 gms. of hexane. This mixture was heated with stirring to about 50° C. for 24 hours followed by stirring for an additional 48 hours at about 23° C. The polymer dissolved to form a polymer cement of about 7 wt. % polymer.

A first batch of 7400 gms. of the polymer cement was chlorinated with 8.4 gms. of chlorine at 60° C. over a period of about ½ hour. Following this, the hexane was stripped off by bubbling nitrogen through while simultaneously Solvent 150 Neutral low cold test oil was added. It took about 3 to 4 hours at temperatures in the range of 70° to 120° C. to strip off the hexane and to add the oil. Following this, the mixture was then nitrogen sparged at 80° C. overnight. A second batch of 7400 gms. of polymer cement was similarly treated except that 5.2 gms. of chlorine was added at 65° C. Two batches were combined. A sample of the oil solution was dialized to remove the oil, and the allylically chlorinated polymer per se analyzed for chlorine. It had 0.82 wt. % chlorine.

EXAMPLE 5

10,000 ml. of a 7 wt. % solution of Polymer B in hexane was placed in a 12 liter flask heated to 60° C., and 25.2 gms. bromine dissolved in 100 ml. of hexane was added to the batch over a period of 1 hour, with stirring. The mixture was nitrogen sparged at 60° C. for 1 hour. Solvent was evaporated from the flask by nitrogen sparging while heating, while Solvent 150 Neutral oil was periodically added to keep the level of the liquid even in the flask. The solvent was continuously removed until the temperature climbed to 120° C. The resulting oil solution was a clear dark brown with a slight trace of haze. The viscinally dibrominated polymer per se contained 4.3 wt. % bromine based on the polymer.

EXAMPLE 6

672 gms. of Polymer B was dissolved in 8928 gms. of Solvent 100 Neutral mineral lubricating oil (100 SUS at 100° F.) in a 12 liter flask equipped with a mechanical stirrer, inlet for Cl, a sodium hydroxide scrubber and a thermometer. A total of 15 gms. of chlorine was added over a period of about 1 hour and 15 minutes while stirring and maintaining the temperature in the range of about 60°-64° C. The composition was then sparged with nitrogen overnight and the following day additional chlorine amounting to another 12.5 gms. was added over a period of 45 minutes while maintaining the temperature at 60° C. The resulting composition was then blown with nitrogen sparging over a weekend. The allylically chlorinated polymer contained 0.77 wt. % chlorine.

EXAMPLE 7

10,000 ml. of a 7 wt. % solution of Polymer B in hexane was placed in a 12 liter flask and a total of 7.2 gms. of bromine was added at 30° C. in the same manner as described with regard to Example 5 and worked up in the same manner. The viscinally dibrominated polymer contained 1.54% bromine.

EXAMPLE 8

710 gms. of Polymer D was dissolved in 1633 gms. of hexane while stirring overnight with warming. The material was then added to a 5 liter flask and excess hexane added. 32.3 gms. of chlorine was added over a period of about 1½ hours at 50° C. followed by nitrogen sparging at 1 hour at 50° C. Following this, 800 gms. of Solvent 100 Neutral oil was added with heating and sparging while the hexane was taken overhead. Finally another 830 gms. of Solvent 100 Neutral oil was added with heating and sparging while the hexane was taken overhead; the sparging continued at room temperature overnight. The following morning the solution was heated to 120° C. with vigorous nitrogen sparge for an additional hour. The theoretical allylic chlorine content was 2.24 wt. % chlorine.

EXAMPLE 9

279 gms. of a solution, previously formed by dissolving 1750 gms. of Polymer B in 23,250 gms. of hexane, was added to a flask. 83.5 gms. of a white oil (mineral oil) was added in a first stage followed by an addition of 192 gms. of additional white oil while nitrogen blowing in order to evaporate hexane. The mixture was then heated to 60° C. and 0.7 gms. of chlorine was added over 40 minutes at 60°-63° C. The mixture was then stirred for ½ hour followed by stripping for an additional 1½ hours at a temperature of 60°-65° C. while maintaining a high nitrogen sparging rate. Analysis showed that the allylically chlorinated polymer per se contained 0.95 wt. % chlorine.

Synthesis of Halogenated Copolymers

EXAMPLES 10 to 15

Six primary chlorine containing terpolymers comprising ethylene, propylene and 5-chloromethyl bicyclo (2,2,1) heptene-2 were synthesized with the aid of a Ziegler-Natta catalyst combination comprising VOCl$_3$Et$_3$Al$_2$Cl$_3$ in an Al/V molar ratio of 5 to 1. All runs were made at 35° C. for a residence time in the reactor of 13.3 minutes, using a VOCl$_3$ + Et$_3$Al$_2$Cl$_3$ catalyst concentration of 0.010 pounds per 100 pounds of hexane solvent, and with a hydrogen feed of 20 ppm per part of ethylene feed by weight. The reaction was carried out by continuously feeding the reactants, solvent, catalyst, etc., to the reactor and withdrawing a stream which contained the polymer. The rate of feed of monomer, yields in pounds of polymer per pound of vanadium, and composition of the polymer product are summarized in the following table.

TABLE I

Synthesis of Primary Chlorine Copolymers

| Example No. | lbs Feed/ 100 lbs. Hexane | | | Yield lbs./lb.V | Polymer Composition | |
|---|---|---|---|---|---|---|
| | $C_2^=$ | $C_3^=$ | CIMN(1) | | Wt.% $C_2^=$ | Wt. % CIMN(2) |
| 10 | 2.5 | 12.0 | 1.0 | 255 | 58.3 | 5.0 |
| 11 | 2.5 | 12.0 | 2.0 | 116 | 63.6 | 10.0 |
| 12 | 2.5 | 12.0 | 1.0 | 317 | 54.7 | 6.1 |
| 13 | 2.5 | 12.0 | 2.0 | 260 | 57.4 | 16.8 |
| 14 | 2.5 | 12.0 | 1.0 | 402 | 52.6 | 5.6 |
| 15 | 2.5 | 12.0 | 2.0 | 291 | 59.4 | 10.0 |

$C_2^=$ is ethylene
$C_3^=$ is propylene
(1)CIMN is 5-chloromethyl norbornene-2.
(2)From chlorine analysis While molecular weight was not determined, prior experience indicated that these terpolymers featuring primary chloro-substitution sites for amine reaction with resultant displacement of the chlorine would have molecular weights in the range of about 30,000 to 70,000 $\overline{M}_n$.

Halo-Copolymer-Amine Reaction Products

EXAMPLE 16

200 gms. of the oil solution of Example 4 containing 7 wt. % of the chlorinated polymer was reacted under nitrogen with 0.3 gms. of a commercial grade of tetraethylene pentamine (TEPA) in the presence of 6.0 gms. of CaO for 70 hours at 135° C. while stirring. At the end of this time, the reaction mixture was diluted with about 600 ml. hexane to reduce the viscosity and centrifuged to remove the CaO. The hexane solvent was then removed by heating on a steam bath with nitrogen blowing and finally heated under vacuum (about 1 mm. Hg pressure) in a laboratory rotary evaporator to recover an oil concentrate free of the hexane. The oil concentrate of the aminated copolymer was then tested for sludge dispersancy. Also a sample of the oil concentrate of aminated copolymer was dialized in a Soxhlet extraction device through a thin semi-permeable rubber membrane using boiling hexane for about 8 hours, in order to remove the oil. The aminated copolymer residue was analyzed and found to contain about 0.31 wt. % nitrogen and about 0.73 wt. % chlorine, said weight percents being based on the aminated terpolymer per se.

EXAMPLES 17 to 53

A series of aminated copolymers were formed in the general manner as described in Example 16, but with variation in the reactants, conditions of reaction, e.g. amounts, times, temperatures, which variations are summarized in Table II.

The aminated products of Examples 16 to 53 were tested for dispersancy ability as follows:

A used automotive mineral lubricating oil, which had an original viscosity of 325 SUS at 100° F., was obtained by pooling the oil drained from the crankcases of a fleet of taxicabs operating in New York City. The used oil is centrifuged in heavy-walled 50 ml. tubes at 16,000 RPM for ½ hour and the clear, supernatant oil decanted for use in the test.

In conducting the test, 100 milligrams of the oil concentrates containing 7 wt. % of the aminated polymers to be tested are weighed into 30 ml. beakers. 10 gms. of the centrifuged oil is added to each beaker and the samples heated on a steam bath with swirling until the additive is completely dissolved and a homogeneous solution is obtained. The contents of each beaker are then transferred to preweighed centrifuge tubes and the tubes stored in an oven at 280° F. (138° C.) for 16 hours. The tubes, including a number of blanks to which no additive has been added but which have been heated to 280° F. for 16 hours, are then centrifuged at 16,000 RPM for ½ hour and the supernatant oil decanted and discarded. The tubes are then inverted in a rack and allowed to drain for not more than 15 minutes, after which the walls of each tube are rinsed with 25 ml. of pentane, taking care not to disturb the sludge compacted in the tip of the tube. A second 25 ml. portion of pentane is added to each tube and the sludge dispersed and any occluded oil dissolved by gentle shaking. The tubes are not centrifuged in an explosion-proof, refrigerated centrifuge at 16,000 RPM for ½ hour, the pentane decanted and discarded. After rinsing the exterior of each tube with acetone, the tubes and contents are allowed to air-dry at room temperature and weighed. The weight of sludge is obtained by difference. The effectiveness of the additive is expressed as the weight % sludge that is left in the tube as compared to the blank. Thus, 100% would indicate no dispersancy with the lower percentages indicating dispersancy.

The aminated terpolymers, their preparation, and their effectiveness as dispersants are summarized in the following Table II.

TABLE II

Preparation of Aminated Copolymers and Dispersancy Results

| Example | Gm.7 wt. % Solution of Halo-Copolymer | Halo-Copolymer of Example | Gm.Amine | Gm.Base | Time, hrs. | Temp. °C. | Wt.% N | Wt.% Hal. | Dispersancy, % of Blank |
|---|---|---|---|---|---|---|---|---|---|
| 16 | 200 | 4 | 0.3 TEPA | 6.0 CaO | 70 | 135 | 0.31 | 0.73 | 30 |
| 17 | 200 | 4 | 0.7 " | 6.0 " | 70 | 135 | 0.47 | 0.59 | 23 |

TABLE II-continued

Preparation of Aminated Copolymers and Dispersancy Results

| Example | Gm.7 wt. % Solution of Halo-Copolymer | Halo-Co-polymer of Example | Gm.Amine | Gm.Base | Time, hrs. | Temp. °C. | Wt.% N | Wt.% Hal. | Dispersancy, % of Blank |
|---|---|---|---|---|---|---|---|---|---|
| 18 | 200 | 4 | 1.0 " | 6.0 " | 70 | 135 | 0.63 | 0.72 | 23 |
| 19 | 200 | 4 | 6.0 DMPA | None | 92 | 135 | 0.31 | 0.65 | 35 |
| 20 | 200 | 4 | 0.5 TEPA | None | 67 | 135 | 0.45 | 0.82 | 28 |
| 21 | 300 | 4 | 0.60 P-400 | 9.0 CAO | 30 | 155 | 0.52 | 0.60 | 25 |
| 22 | 3300 | 4 | 10.9 P-400 | None | 90 | 135 | 0.62 | 0.78 | 42 |
| 23 | 300 | 4 | 0.9 P-400 | " | 29 | 151 | 0.52 | 0.69 | 28 |
| 24 | 300 | 4 | 0.9 P-400 | " | 8 | 180 | — | — | 27 |
| 25 | 800 | 2 | 10.0 DMPA | 10.0 CaO | 24 hrs. at then 48 hrs. at | 125 150 | .24 | .92 | 43.2 |
| 26 | 200 | 2 | 3.0 DMPA | 5.0 CaO | 72 | 135 | .12 | .99 | 34.4 |
| 27 | 200 | 1 | 6.0 DMPA | 10.0 CaO | 72 | 135 | .21 | 2.25 | 17.3 |
| 28 | 200(a) | 1 | 6.0 DMPA | 10.0 Cao | 72 | 135 | .12 | 1.99 | 16.3 |
| 29 | 200 | 2 | 6.0 DMPA | None | 112 | 135 | .30 | 1.18 | 24 |
| 30(e) | 200 | 10 | 6.0 DMPA | 6.0 CaO | 7 | 150 | — | — | 8.2 |
| 31 | 200 | 4 | 0.4 DETA | None | 6 | 180 | — | — | 47 |
| 32 | 250 | 2(b) | 1.5 DOA | None | 7 | 180 | 0.03 | — | 56 |
| 33 | 300 | 2(b) | 1.12 DIPA | None | 29 | 165 | — | — | 36 |
| 34 | 100 | 5 | .26 DIPA | None | 3 | 130 | — | — | 22 |
| 35 | 100 | 5 | .21 DEPA | None | 3 | 130 | — | — | 32 |
| 36 | 100 | 5 | .23 EDTE | None | 3 | 130 | — | — | 43 |
| 37 | 168(c) | 14 | 11.5 P-400 | None | 6 | 180 | — | — | 20 |
| 38 | 50 | 5 | .2 TBA | None | 0.30 | 25 | — | — | 31 |
| 39 | 350 | 14 | 1.4 P-400 | None | 21 | 200 | — | — | 43 |
| 40 | 200 | 4 | 6.0 DMPA | 10.0 CaO | 65 | 135 | 0.23 | 0.52 | 21 |
| 41 | 100 | 7(d) | 0.23 P-400 | None | 3 | 25 | — | — | 22 |
| 42 | 350 | 4 | 1.4 P-400 | None | 3 | 180 | — | — | 13 |
| 43 | 350 | 4 | 1.05 P-400 | 1.0 CaO | 6 | 180 | — | — | 16 |
| 44 | 350 | 4 | 1.05 P-400 | 1.0 CaO | 3 | 200 | — | — | 23 |
| 45 | 200 | 5 | 0.36 DMA | None | .75 | 130 | — | — | 55 |
| 46 | 20 | 5 | 0.1 DBA | None | .5 | 25 | 0.056 | 0.29 | 12 |
| 47 | 1300 | 14 | 20 DMPA | 20 CaO | 17 | 175–190 | 0.033 | 1.25 | 92 |
| 48 | 200 | 14 | 1 DMPA | 3 CaO | 17 | 150 | — | — | 100+ |
| 49 | 200 | 14 | 1 DMPA | 2.5 MgO | 17 | 150 | — | ' | 100+ |
| 50 | 2143 | 14 | 53.6 DMPA | 53.6 CaO | 8 | 150 | — | — | 100+ |
| 51 | 200 | 14 | 6 DMPA | 30 CaO | 70 | 135 | — | — | 98 |
| 52 | 200 | 14 | 0.5 TEPA | — | 3 | 200 | — | — | 100+ |
| 53 | 3300 | 14 | 9.07 P-400 | — | 90 | 135 | 0.22 | — | 100 |

Notes:
TEPA - tetraethylene pentamine
DMPA - N,N-dimethyl 1,3-propanediamine
P-400- A commercial poly(alkylene polyamine) equivalent to TEPA
DETA - Diethylene triamine
DOA - dioctyl amine
DIPA - diisoprpanol amine
DEPA - diethanol amine
EDTE - ethylene diamine tetrethanol
TBA - tributyl amine
DMA - dimethyl amine
DBA - dibutylamine
(a)The oil concentrate was heated under $N_2$ for three hours at 150° C. and six hours at 160° C. and then reacted.
(b)This was similar to Example 2, but a different batch.
(c)168 grams of the halopolymer per se was used.
(d)This was similar to Example 7, but a different batch with an estimated bromine content of 1.37 wt. %.
(e)This experiment gave an anomalous result which could not be repeated in further experimentation as represented by Examples 48–50.

The data of Table II (Examples 34–36, 38, 41 and 45–46) demonstrates that the amine reactions with the viscinal dibromosubstituted copolymers goes rapidly under moderate temperature conditions, i.e. from about 0.3 to 3 hours at 25° C. and up (Examples 34–36 and 45 were carried out at higher than required temperatures to ensure reaction completion) when related to the extreme reaction conditions of 12 to 20 hours at from 100° to 190° C. for the primary bromine containing terpolymer of U.S. Pat. No. 2,445,387.

Thus with the brominated copolymers amination can be accomplished at from about 0.1 to 10 hours, preferably 0.5 to 5 hours, and a temperature ranging from about 20° C. to about 150° C., preferably from about 25° C. to about 120° C.

Further the allylically chlorinated polymers are seen from Table II to aminate by reaction with amines at much less stringent time-temperature conditions than those required for comparable amination of the primary chlorine containing terpolymer, e.g. Example 39 has typical amination conditions of 21 hours at 200° C. for the latter type. Comparisons of: Example 40 with Examples 48 and 49; Examples 17 and 18 with Example 51; and Example 22 with Example 53, illustrates that amination of the allylically chlorinated polymer is complete where amination of the primary chlorinated polymer has not occurred under substantially identical reaction conditions of time and temperature. Thus, with the allylically chlorinated polymers in the process of this invention amination can be accomplished at from about 3 to 100 hours, preferable 5 to 20 hours and a temperature of from about 80° to about 200° C., preferably from about 135° to 180° C.

It is to be unerstood that often the viscosity of the halogenated copolymer is so high that a higher temperature facilitates stirring even though the reactions do not require it.

EXAMPLE 54

3500 grams of 7 wt. % solution of the haloterpolymer of Example 4 in the Solvent 150 Neutral oil was reacted with 14 grams of Polyamine 400 for a total of about 7 hours at about 180° C. while sparging with nitrogen and vigorously stirring, followed by dilution with hexane, filtering through a filter bed with filter aid, then evaporation of the hexane on a steam bath while sparging with nitrogen. A clear yellow concentrate resulted.

A fully formulated 10W-30 SAE crankcase lubricating oil containing ashless dispersant, antioxidants, and about 6.3 wt. % of a V.I. improver concentrate containing about 7 wt. % of ethylene-propylene copolymer (which was not aminated) as a viscosity index improver, was tested in a Sequence V-C engine test. For comparison, the same formulation was tested — but in place of the ethylene-propylene copolymer concentrate there was used about 6.3 wt. % of the concentrate described above.

The Sequence V-C is definitively described in "Multicylinder Test Sequences for Evaluating Automotive Engine Oils," ASTM Special Technical Publication 315F, 1973, page 133 ff. The V-C test evaluates the ability of an oil to keep sludge in suspension and to keep varnish deposits from the pistons and other parts. The test results given below clearly show the superior ability of a test oil incorporating a dispersant-viscosity index improver of this invention.

TABLE III

MS - V-C Test Results

|  | Sludge | Piston Skirt Varnish | Total Varnish |
|---|---|---|---|
| Oil with dispersant-V.I. improver of Example 54 | 8.9 | 8.5 | 8.4 |
| Oil with ethylene-propylene V. I. improver | 8.0 | 8.2 | 7.6 |
| Passing criteria for test | 8.5 | 8.0 | 8.0 |

In the above test, the ratings are on a scale of 0 to 10, where 0 is extremely poor, and 10 is completely clean. As seen by the above data in Table III, the use of an aminated V.I. improving polymer of the invention, in place of a non-aminated polymer, significantly improved the performance of the oil composition in keeping the engine clean.

The invention in its broader aspect is not limited to the specific details shown and described and departures may be made from such details without departing from the principles of the invention and without sacrificing its chief advantages.

What is claimed is:

1. A method for preparing an oil-soluble, sludge dispersing, aminated copolymer, said aminated copolymer having a molecular weight in the range of about 1000 to 500,000 $\overline{M}n$, and containing about 0.02 to about 2.0 wt. % nitrogen, based on the weight of said aminated copolymer, comprising the steps of solution brominating a terpolymer having an olefinic double bond in a hydrocarbon moiety which is pendant to the backbone chain of carbon atoms with a brominating agent to incorporate from about 0.1 to 10 wt. % vicinally substituted bromine in said pendant hydrocarbon moiety, said terpolymer comprising ethylene, a $C_3$ to $C_{18}$ straight or branched chain α-olefin and a $C_5$ to $C_{14}$ acyclic or alicyclic non-conjugated diolefin, said solution brominating step being carried out at a temperature of from 0° to 100° C.; and thereafter aminating said brominated terpolymer with a $C_1$ to $C_{60}$ amine containing 1 to 12 amine groups by reacting said amine with said brominated terpolymer until from about 10 to 100 mole percent of the bromine content of said terpolymer is replced by amination groups, said reacting being carried out at a temperature in the range of about 20° C. to about 150° C. and for a period of from 0.1 to 10 hours.

2. A method according to claim 1 wherein said brominating agent is bromine and said reacting is at a temperature in the range of about 25° C. to about 120° C. and for a period of 0.5 to 5 hours.

3. In a process according to claim 1 wherein said solvent is mineral oil.

4. A process according to claim 1 wherein said molecular weight is about 20,000 to 100,000, said nitrogen content is about 0.1 to 1.0 wt. % nitrogen, and said alpha olefin is a $C_3$ to $C_8$ olefin and said solvent is a liquid hydrocarbon.

5. A process according to claim 4 wherein said terpolymer is a copolymer of ethylene, propylene and said diolefin.

6. A process according to claim 5 wherein said diolefin is selected from the group consisting of 5-ethylidene norbornene-2 and 1,4-hexadiene.

7. A process according to claim 5, wherein said amine is a poly(ethyleneamine) of 2 to 6 nitrogens.

8. A method for preparing an oil-soluble, sludge dispersing, aminated copolymer, said aminated copolymer having a molecular weight in the range of about 1000 to 500,000 $\overline{M}n$, and containing about 0.02 to about 2.0 wt. % nitrogen, based on the weight of said aminated copolymer, comprising the steps of solution chlorinating a terpolymer having an olefinic double bond in a hydrocarbon moiety which is pendant to the backbone chain of carbon atoms with a chlorinating agent to incorporate from about 0.1 to 10 wt. % allylically substituted chlorine in said pendant hydrocarbon moiety, said terpolymer comprising ethylene, a $C_3$ to $C_{18}$ staight or branched chain α-olefin and a $C_5$ to $C_{14}$ acyclic or alicyclic non-conjugated diolefin, said solution chlorinating step being carried out at a temperature of from 0° to 100° C.; and thereafter aminating said chlorinated terpolymer with a $C_1$ to $C_{60}$ amine containing 1 to 12 amine groups by reacting said amine with said chlorinated terpolymer until from about 10 to 100 mole percent of the chlorine content of said terpolymer is replaced by amination groups, said reacting being carried out a temperature in the range of about 80° C. to about 200° C. and for a period of from 3 to 100 hours.

9. A method according to claim 8 wherein said chlorinating agent is chlorine and said reacting is at a temperature in the range of about 135° C. to about 180° C. and for a period of 5 to 20 hours.

* * * * *